United States Patent [19]

Waltenburg

[11] Patent Number: 4,926,901

[45] Date of Patent: May 22, 1990

[54] FLUID SUPPLY LINE FLOW CONTROL DEVICE

[76] Inventor: Harold D. Waltenburg, 11754 Woodbine St., N. W., Coon Rapids, Minn. 55433

[21] Appl. No.: 372,668

[22] Filed: Jun. 28, 1989

[51] Int. Cl.[5] .............................................. F16K 17/00

[52] U.S. Cl. .................................... 137/456; 137/486; 137/495; 137/624.12

[58] Field of Search ...................... 137/624.11, 624.12, 137/486, 487.5, 495, 456, 460; 368/112

[56] References Cited

U.S. PATENT DOCUMENTS

| | | | |
|---|---|---|---|
| 3,088,270 | 5/1963 | King | 368/112 |
| 4,249,565 | 2/1981 | Brust | 137/495 |
| 4,589,435 | 5/1986 | Aldrich | 137/624.12 X |
| 4,730,637 | 3/1988 | White | 137/624.2 X |
| 4,807,661 | 2/1989 | Lewis | 137/624.12 X |

*Primary Examiner*—Alan Cohan

*Attorney, Agent, or Firm*—Lawrence M. Nawrocki

[57] ABSTRACT

The present invention deals broadly with the field of plumbing. More narrowly, however, it deals with apparatus for controlling flow through a fluid supply line. The preferred embodiment of the invention is directed to a mechanism for automatically terminating flow through a fluid supply line when flow through the line continues for a period of time greater than a defined time, such as when a break in the line occurs.

5 Claims, 1 Drawing Sheet

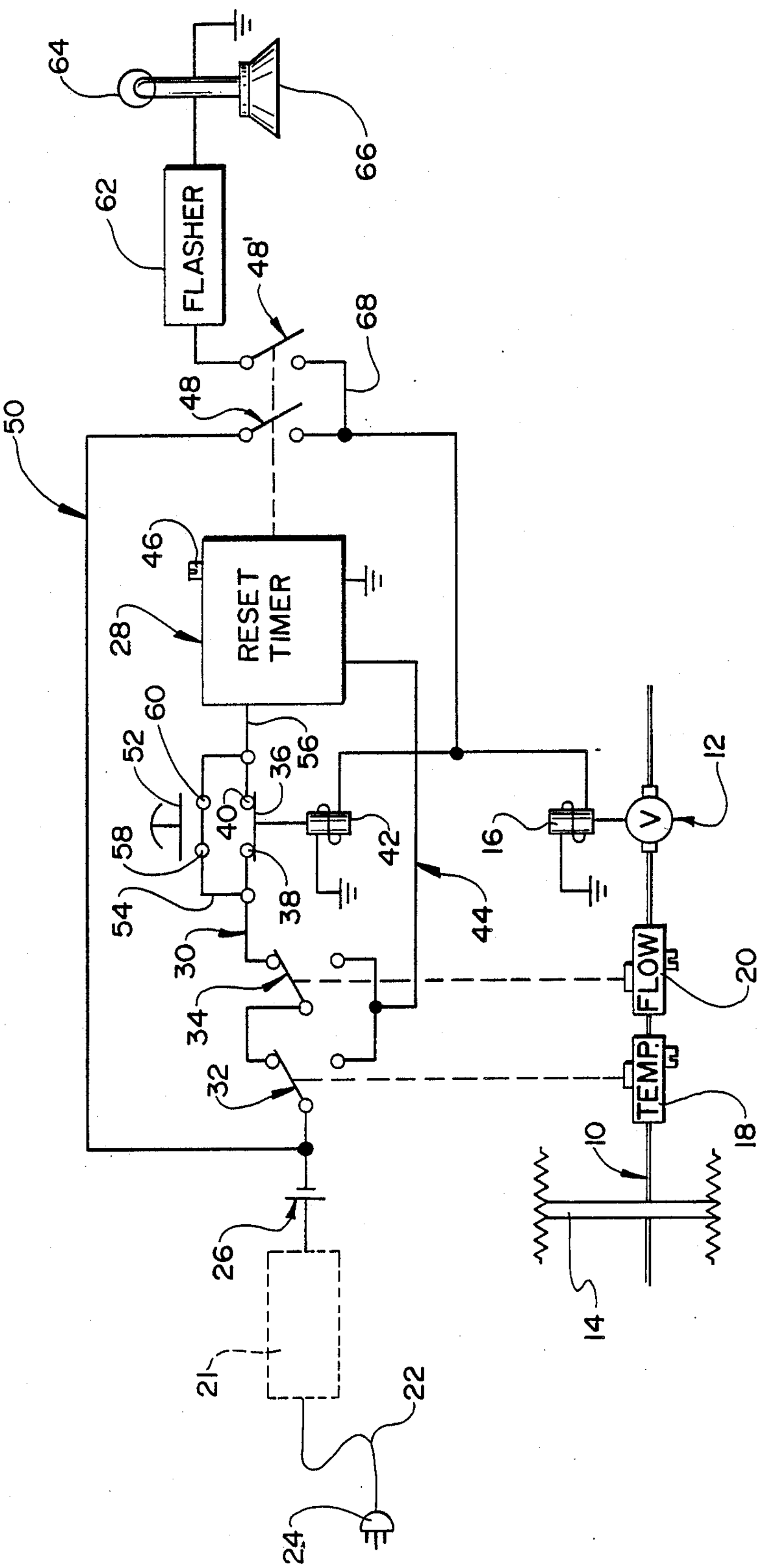
FLASHER
RESET
TIMER
FLOW
TEMP.
V
10
12
14
16
18
20
21
22
24
26
28
30
32
34
36
38
40
42
44
46
48
48'
50
52
54
56
58
60
62
64
66
68

FLUID SUPPLY LINE FLOW CONTROL DEVICE

BACKGROUND OF THE INVENTION

Fluid flow and control units are known in the prior art, and such systems lend themselves to numerous applications. For example, industries employing chemical processing utilize such systems for channeling a chemical agent to one or more stations at which processing occurs.

Another application for such systems is a conventional water distribution system in a residential dwelling or commercial or industrial building. In residential systems, a supply line to the house comes off a main municipality trunk line, The supply line to the house enters the building, typically through its foundation, and is, shortly thereafter, metered so that usage can be ascertained. Thereafter, numerous branch lines divert water flow throughout the dwelling. Branch lines channel water to bathrooms, a kitchen, lawn sprinkling outlets, etc. It is intended that the system be provided with a substantially uniform pressure at a point in the main supply line just outboard of the meter.

Many residential units which were built in the early part of the twentieth century and even earlier, are still occupied today. In many cases, plumbing systems in those buildings date back almost as far, if not as far, as the date when the residence was built. When the plumbing systems are that old, they certainly become susceptible to pipe clogging and rupture resulting from such clogging, old age, etc.

Typically, the plumbing system of a house is unmonitored. In fact, homes can even be unoccupied for extended periods of time. Home owners may temporarily vacate the premises during vacations, extended business trips, and for other reasons.

Even when the occupants of a home are away for only a few hours (for example, while shopping, attending a movie, etc.), the rupture of a pipe in the plumbing system can cause significant damage. Damage can be significantly aggrevated if a pipe bursting occurs during a period of extended absence of the residents. In fact, during periods of significant absence, even a relatively minor leak in a pipe can cause disastrous damage.

In an industrial scenario, losses can extend beyond property damage. In the management and conservation of caustic chemicals, a slow leak or burst pipe could result in injury, or even death, to employees.

It is to these problems of the prior art that the present invention is directed. It is a flow control device for use with an in-place plumbing system which automatically terminates flow through a fluid supply line if continuous flow through the line, which might result from a burst or leaky pipe, occurs.

SUMMARY OF THE INVENTION

The present invention is an apparatus for closing a fluid supply line at a location typically up-flow of where a crack or burst would occur, and for terminating fluid flow of the line beyond that location. The apparatus includes a valve interposed in the supply line at the location at which closure is desired. Such a valve is normally open during usage of the plumbing system. A sensor is interposed in the supply line up-flow of the closure control valve. The sensor is inserted into the line in order to ascertain that flow through the supply line is occuring. Power means are provided, as are timing means, actuatable by the power means. The timing means, it is intended, would include three operational modes: a reset mode, a timing mode, and a trip mode. A normally-closed reset circuit also comprises a component of the invention. A first two-position switch is included in that circuit. The switch is normally-disposed in a first position wherein power is provided from the power means to maintain the timing means in its reset mode. The switch is responsive to the sensor, wherein the switch is moved to its second position when the sensor ascertains that fluid flow exists through the supply line. A normally-open initiation circuit also comprises a component of the invention. The initiation circuit is closable by the two-position switch when that switch is moved to its second position. With the switch in the second position, the power means initiates the timing mode of the timing means. A normally-open control circuit also comprises a component of the invention. A second two-position switch is included in the control circuit. That second switch is normally in a first, open position, wherein the control circuit is maintained open. The second switch is responsive to the timing means so that the timing means, when, after being in the timing mode for a predetermined period of time, automatically initiates the trip mode. When the trip mode is actuated, the second two-position switch is moved by the timing means to its second position to close the control circuit. When the control circuit is closed, power from the power means is delivered to the normally-open closure valve to close that valve. Finally, means are provided for opening the reset circuit when the control circuit is closed.

The preferred embodiment of the invention includes a manually-actuated, two-position override reset switch. Such an override reset switch is disposed in the reset circuit and includes a first, normal, open position and a second, closed position. When the control circuit is closed, and the reset circuit, as previously discussed, is opened as a result thereof, the manually-actuated override switch can be moved to its second position to close the reset circuit. Such closure initiates the timing means in its reset mode and thereby, recycles the operation of the device. Actuation of the manual override switch would, typically, be effected after repairs were made to correct whatever condition initiated the termination of flow in the supply line.

One embodiment of the invention would provide means for biasing the override switch to its first position. Consequently, actuation of the override switch would be instantaneous to reset the timer means in the reset mode thereof, and, upon release of the override switch, the switch would return to its first position.

If desired, one or more annunciators can be included. It is specifically contemplated that aural and visual annunciators could be interposed in the control circuit. When the timing means is in its trip mode, therefore, and the control circuit is closed, any annunciators employed would be actuated.

It is also contemplated that a temperature sensor could also be placed in the fluid flow supply line at a location proximate the flow sensor. Such a temperature sensor would have the same function as does the flow sensor. That is, particularly in embodiments having aural or visual annunciators, a temperature sensor, after sensing either a high or low temperature in the supply line, would function to actuate the timer means in its timing mode. If no correction were made to the temperature within the preset period of time, the timing means would enter its trip mode and move the second two-position switch to its second position thereof. Closure of the control circuit would, thereby, result in termination of flow through the supply line and actuation of the one or more annunciators.

The present invention is thus improved apparatus for terminating flow of a fluid through a supply line in response to the sensing of various conditions. More specific features and advantages obtained in view of those features will become apparent with reference to the DETAILED DESCRIPTION OF THE INVENTION, appended claims, and accompanying drawing figure.

BRIEF DESCRIPTION OF THE DRAWING

The FIGURE is an electrical diagram illustrating the various circuits employed in the present invention.

DETAILED DESCRIPTION OF THE INVENTION

Referring now to the drawing wherein like reference numerals denote like elements throughout the several views, the figure illustrates a fluid supply line 10 through which, for example, water entering a residential dwelling would be channeled. A normally-open closure valve 12 is interposed in the supply line 10 proximate the wall 14 in the building through which the supply line 10 enters. As indicated, the valve 12 is in a normally-open position, and it can be closed, in response to the sensing of flow through the supply line 10, for a period of time greater than a preset time in a manner that will be discussed hereinafter. Typically, a solenoid 16 would be employed to close the closure valve 12.

Temperature and flow sensors 18, 20 are shown as being positioned in the supply line 10 between the wall 14 of the building and the closure valve 12. The temperature sensor ascertains whether or not the fluid flowing through the supply line is at a temperature above or below a defined temperature. Adjustment means can be provided to vary the preset temperature.

The flow sensor is intended to sense whether flow of the fluid is passing through the supply line. As in the case of the temperature sensor, the flow sensor can be provided with adjustment means in order to vary the sensitivity of the sensor.

The FIGURE illustrates a power supply 21 which can be plugged into, for example, a conventional 110 V wall outlet (not shown) by means of a cable 22 and plug member 24 attached thereto. The function of the power supply 21 is to maintain, during normal conditions when power is provided to the electrical system of the building, charge on a battery 26. The battery 26, in turn, serves as power means for the flow control mechanism. As will be able to be seen in view of this disclosure, even if conventional AC power within the building is lost, the battery 26 will continue to funtion to generate power for the device.

The flow control device includes timing means which is illustrated as being an electrical timer mechanism 28. The timer 28 has three modes of operation: a reset mode, a timing mode, and a trip mode. The significance of these modes and activity which occurs when the timer 28 is in each of these modes will be discussed hereinafter.

The device illustrated in the FIGURE illustrates a reset circuit 30. This circuit 30 extends from the battery 26 to the reset timer 28 and, when flow does not occur through the supply line 10, will be maintained continuous. Consequently, power will be provided from the battery 26, and the timer 28 will be maintained as what is defined as the "reset mode". The reset circuit 30 is shown as having a pair of switches 32, 34, each actuatable by one of the temperature and flow sensors 18, 20. Both switches 32, 34 are normally in first, closed positions to maintain power flow through the reset circuit 30.

The reset circuit 30 aslo includes a breaker switch 36 which is normally closed to maintain the circuit continuous. The switch 36, as shown, is solenoid-actuated, and biasing means (not shown) can be employed to maintain the switch 36 closed across the terminals 38, 40 in the reset circuit 30. Actuation of the solenoid 42 in a manner as will be discussed hereinafter, will overcome the bias and open the switch 36.

The invention also includes an initiation circuit 44. The initiation circuit 44 is generally in parallel with the reset circuit 30 and functions to transmit power from the battery 26 to the reset timer 28. Flow of energy through the initiation circuit 44, however, will initiate the timer 28 in its timing mode. That is, the timer 28 will be started when power flows through the initiation circuit 44.

As will be able to be seen in the drawing FIGURE, if flow through the supply line 10 is sensed by the flow sensor 20, its corresponding switch 34 will move through the first position illustrated in the FIGURE, to its lower, second position. This will render the reset circuit 30 discontinuous and close the initiation circuit 44, since the temperature sensor switch 32 and flow sensor switch 34 are, in essence, in parallel.

Similarly, even though flow through the supply line 10 might not be sensed, if the temperature sensor 18 ascertains a thermal condition outside preset limits, it will move the switch 32 associated therewith from its position illustrated in the FIGURE to its lower, second position. This, again, will render the reset circuit 30 discontinuous an close the initiation circuit 44.

It will also be noted that if both temperature outside the preset limits is sensed and, concurrently, flow through the supply line is sensed, both switches 32, 34 will be moved to their second positions. The end result will be the same. The reset circuit 30 will be made discontinuous, and the initiation circuit 44 will be closed.

As previously indicated, power flow through the initation circuit 44 will start the timer 28. A desired time can be adjustably preset by an adjustment screw 46 or other appropriate means. If closure of the initiation circuit 44 has been accomplished by the flipping of the switch 34 associated with the flow sensor 20, if flow continues to be sensed for a period of time beyond the preset time, the timer 28 will be made to function in a "trip" mode. In this mode, a switch 48 in a control circuit 50 can be moved from a first, open position to a second, closed position. Closure of this switch 48 by the entry of the timer 28 into its control mode will effect closure of the control circuit 50. With closure of the control circuit 50, operation of the solenoid 16 governing closure of the closure valve 12 will be initiated to close the valve 12.

Similarly, closure of the control circuit 50 will also function to open the solenoid-controlled switch 36 in the reset circuit 30. The switch 36 is provided, since, once the closure valve 12 operates to terminate further flow of fluid through the supply line 10, the flow sensor 20 will no longer sense a flow, and its associated switch 34 will return to its first position. If the solenoid-controlled switch 36 were not employed, the reset circuit 30 would again be empowered, and the timer 28 would tend to be returned to its reset mode. This would result in lurching of the timer 28 between the various modes, since, once the valve 12 were opened, flow would again be permitted, and the timer 28 would cycle through its three modes sequentially. It is desirable, therefore, that, once the timer 28 achieves its trip mode, the closure valve 12 be maintained in a position obstructing flow through the supply line 10 until the condition inducing flow through the supply line 10 beyond the preset time is corrected.

As will be able to be seen in view of this disclosure, if normal flow through the supply line 10 is induced because of, for example, in the residential scenario, use of a dishwasher, the preset time set into the timer 28 would be longer than any cycle demanding continuous water flow. As a cycle starts, the flow sensor 20 would ascertain that flow is occurring through the supply line 10, and opening of the reset circuit 30 and closure of the initiation circuit 44 would occur. Once the cycle ends, however, and flow to the dishwasher is discontinued, the switch 34 associated with the flow sensor 20 will return to its normal, upper, first position, and the initiation circuit 44 will be broken and the reset circuit 30 will be closed. The timer 28 will, thereby, be reset. It will be noted that the trip mode is never achieved as long as the preset time set into the timer 28 never expires. Consequently, during normal operation of an appliance or opening of a faucet, the closure valve 12 will never be closed, and the solenoid-controlled switch 36 in the reset circuit 30 will never be opened.

The FIGURE illustrates a manually-actuated, two-position override reset switch 52 in a leg 54 of the reset circuit 30 parallel to the primary leg 56. The leg 54 in which the override reset switch 52 resides is across the solenoid-controlled switch 36. Consequently, when it has been ascertained that the trip mode of the timer 28 and the closure of the control circuit 50 have been achieved, and the condition initiating the sequential mode translation (for example, the rupture of a pipe in the system) repaired, an operator can volitionally recycle the device and reset the timer 28 by moving the override reset switch 52 to its second position (one wherein the switch bridges the contacts (58, 60) in the parallel branch 54 of the circuit 30) in order to close the reset circuit 30. It will be remembered that, once the control circuit 50 has been closed and the solenoid-actuated valve 12 closed, flow will be discontinued, and the switch 34 associated with the flow sensor 20 will return to its first position. The reset circuit 30 will, therefore, be made continuous.

With the reset mode being re-achieved, the solenoid-controlled switch 36 will be closed to the position shown in the FIGURE, and the closure valve 12 in the supply line 10 will be opened. Normal operation of the fluid flow system will then resume.

The FIGURE illustrates a flasher 62, other visual annunciator means 64, and aural annunciator means 66 for signaling that flow beyond the preset period has been sensed, the timer 28 has been actuated in its trip mode, and the solenoid-actuated valve 12 has been closed. The FIGURE illustrates a dual pole switch 48, 48', actuated by the timer 28 when the timer 28 enters its trip mode, for causing the annunciators 64, 66 and flasher 62 to become operative. The flasher 62 and annunciators 64, 66 are in a branch circuit 68 off of the control circuit 50, and the dual pole switch 48, 48' includes one pole 48 in the control circuit 50 and one pole 48' in the branch circuit 68. It will be understood, however, that the branch circuit 68 could be continuous, and a single pole switch, the pole being placed in the control circuit 50, could be employed.

As previously mentioned, both the flow sensor 20 and temperature sensor 18 are capable of initating the timing mode of the timer 28 and causing the timer 28 to enter into the trip mode, if the condition sensed is not rectified. Either sensor, therefore, is capable of empowering the solenoid 16 for closing the closure valve 12 to effect interruption of flow. It may appear that flow need not be terminated because of a sensed temperature outside a desired range. It will be borne in mind, however, that entry of the timer 28 into the trip mode, closure of the control circuit 50, and actuation of the closure valve control solenoid 16 are also accompanied by actuation of the various annunciators 64, 66. An operator, hearing or seeing activation of an annunciator 64, 66 can check out the sytem and, thereby, ascertain that the temperature is outside prescribed limits and take appropriate action.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Apparatus for automatically terminating flow through a fluid supply line in response to continuous flow through the line for a period greater than a defined time, comprising:

(a) a normally-open control valve in the supply line;

(b) a sensor in the supply line, up-flow of said control valve, for ascertaining flow of fluid through the supply line;

(c) power means;

(d) timing means actuatable by said power means, said time means operational in reset, timing, and trip modes;

(e) a normally-closed reset circuit having a first two-position switch therein, said switch normally being in a first position thereof to provide power from said power means to maintain said timing means in said reset mode thereof, and said switch being responsive to said sensor to move to a second position thereof when flow of fluid through the supply line is ascertained;

(f) a normally-open initiation circuit, closable by said two-position switch when it has been moved to said second position, to provide power from said power means to initiate said timing means in said timing mode thereof;

(g) a normally-open control circuit having a second two-position switch therein, said second two-position switch normally being in a first, open position to maintain said control circuit open, and said second two-position switch being responsive to said timing means, when said timing means, after a predetermined period of time after entering said timing mode thereof, is automatically initiated in said trip mode thereof, to be moved by said timing means to said second two-position switch's second position to close said control circuit and provide power from said power means to said normally-open control valve, to close said valve; and (h) means, actuatable when said control circuit is closed, for opening said reset circuit.

2. Apparatus in accordance with claim 1 further comprising a manually-actuated, two-position override reset switch disposed in said reset circuit, said override reset switch having a first, normal, open position and a second, closed position, wherein, when said control circuit is closed and said reset circuit is opened by said opening means, said override switch can be manually moved to said second position thereof to close said reset circuit and to initiate said timing means in said reset mode thereof.

3. Apparatus in accordance with claim 2 further comprising means for biasing said override switch to said first position thereof.

4. Apparatus in accordance with claim 1 further comprising a visual annunciator in said control circuit, wherein, when said timing means is in said trip mode thereof and said control circuit is closed, said visual annunciator will be actuated.

5. Apparatus in accordance with claim 1 further comprising an aural annunciator in said control circuit, wherein, when said timing means is in said trip mode thereof and said control circuit is closed, said aural annunciator will be actuated.

* * * * *